(12) United States Patent
Chang et al.

(10) Patent No.: US 7,345,709 B2
(45) Date of Patent: Mar. 18, 2008

(54) METHOD AND APPARATUS FOR DISPLAYING COMPONENT VIDEO SIGNALS

(75) Inventors: Chien-Ken Chang, Taoyuan Sien (TW); Chung-Yi Yang, Taoyuan Sien (TW); Chun-Hao Lee, Taoyuan Sien (TW); Bao-Kim Liu, Taoyuan Sien (TW)

(73) Assignee: Delta Electronics, Inc., Taoyuan Sien (TW)

( * ) Notice: Subject to any disclaimer, the term of this patent is extended or adjusted under 35 U.S.C. 154(b) by 529 days.

(21) Appl. No.: 10/912,170

(22) Filed: Aug. 6, 2004

(65) Prior Publication Data

US 2005/0030426 A1   Feb. 10, 2005

(30) Foreign Application Priority Data

Aug. 8, 2003 (TW) ............................. 92121770 A

(51) Int. Cl.
  *H04N 11/20* (2006.01)

(52) U.S. Cl. .................................................... 348/558

(58) Field of Classification Search ................ 348/558, 348/441, 443, 445, 446, 448, 449
See application file for complete search history.

(56) References Cited

U.S. PATENT DOCUMENTS

| | | | | |
|---|---|---|---|---|
| 5,583,654 A | * | 12/1996 | Oguro | 386/96 |
| 5,679,845 A | * | 10/1997 | Ohsumi et al. | 562/126 |
| 5,790,096 A | * | 8/1998 | Hill, Jr. | 345/600 |
| 5,909,532 A | * | 6/1999 | Kanota et al. | 386/26 |
| 6,486,869 B1 | * | 11/2002 | Nakano | 345/157 |
| 6,798,458 B1 | * | 9/2004 | Unemura | 348/448 |

* cited by examiner

*Primary Examiner*—Paulos M. Natnael
(74) *Attorney, Agent, or Firm*—Birch, Stewart, Kolasch & Birch, LLP

(57) ABSTRACT

A method and an apparatus of displaying component video signals. Firstly, a component video signal is received, and a vertical synchronous signal and a horizontal synchronous signal are separated from the component video signal. Thereafter, the format of the component video signal is determined by analyzing the vertical synchronous signal and the horizontal synchronous signal, and a video processing route corresponding to the format of the component video signal is chosen to generate visual output from the component video signal. Thus the visual output is displayed.

6 Claims, 4 Drawing Sheets

METHOD AND APPARATUS FOR DISPLAYING COMPONENT VIDEO SIGNALS

This Nonprovisional application claims priority under 35 U.S.C. § 119(a) on Patent Application No(s). 092121770 filed in Taiwan, Republic of China on Aug. 8, 2003, the entire contents of which are hereby incorporated by reference.

BACKGROUND

The invention relates to a display method and apparatus, and in particular, to a display method and apparatus capable of displaying component video signals conforming to various formats. Component video signals conforming to different formats are processed separately by corresponding application circuits, thus the display quality can be optimized.

Most conventional basic entry-level display apparatuses comprising component video signal inputs only support YCbCr (480i, 576i) formats, while higher level display apparatuses further support YPbPr (480p, 576p, 720p, 1080i) formats. Different component video signal formats, however, can not offer optimized video quality with only one application circuit. For example, to display a component video signal, a component video signal conforming to the YCbCr (480i, 576i) format is first decoded and converted to a digital video signal by a video decoder (e.g. Philips SAA7118 or Micronas VPC3230), and is then de-interlaced by a de-interlacer to obtain a progressive video signal (480p, 576p), which is then sent to a scaler IC to generate visual output. Currently, most of the video decoders and de-interlacers are capable of handling YCbCr (480i, 576i) formats, but unable to handle YPbPr (480p, 576p, 720p and 1080i) formats. To display component video signals conforming to YPbPr (480p, 576p, 720p, 1080i) formats, an analog-digital converter (ADC, e.g. Analog Device Inc. AD9883) is required to convert the component video signals into digital video signals, and a color space converter (CSC) is required to convert the color space of the digital video signal into RGB format before the scaler IC can generate visual output therefrom.

Circuits for processing YCbCr (480i, 576i) format component video signals are totally different from circuits for processing YPbPr (480p, 576p, 720p, 1080i) format component video signals. Additionally, conventional display apparatuses supporting multiple component video signal formats generally provide an on screen display (OSD) control for manually switching between YCbCr or YPbPr modes, which may be considered inconvenient. Some component video signal output terminals on DVD players are marked as conforming to YPbPr format, but actually output YCbCr (480i, 576i) format video signals, resulting in confusion when switching modes.

Some other display apparatuses supporting multiple component video signal formats route all video signals into the analog-digital converter and the color space converter, and then generate corresponding visual output through the scaler IC. This design reduces costs and design complexity, but sacrifices display quality for YCbCr (480i, 576i) format component video signals. As the obtained display quality for YCbCr component video signals is much worse than that obtained from a conventional video decoder and de-interlacer. For example, the anti-copying technology (i.e. Macrovision) in the video decoder is better than that in the analog-digital converter. Additionally, the video decoder is capable of providing saturation and tint adjustment, which is not provided by the analog-digital converter. Thus for YCbCr component video signals, the video decoder is more preferable.

SUMMARY

Embodiments of the invention provide a method of display for use in a display apparatus supporting multiple component video formats. The format of a component video signal is automatically detected, and visual output is generated through corresponding application circuits, thus optimized video quality and compatibility can be provided while displaying component video signals of different formats.

First, a component video signal is received, and a vertical synchronous signal and a horizontal synchronous signal are separated from the component video signal. Thereafter, the format of the component video signal is determined by analyzing the vertical synchronous signal and the horizontal synchronous signal, and a video processing route corresponding to the detected format of the component video signal is chosen to generate visual output from the component video signal. Thus the visual output is displayed.

Embodiments of the invention further provide a display apparatus supporting multiple component video signal formats. The display apparatus comprises a synchronous signal separation circuit for separating a vertical synchronous signal and a horizontal synchronous signal from the component video signal, a video processing module comprising a plurality of video processing units, a microprocessor for determining the format of the component video signal by analyzing the vertical synchronous signal and the horizontal synchronous signal, and accordingly choosing and controlling a plurality of video processing units to generate visual output from the component video signal, and a display for displaying the visual output.

Farther scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1A:
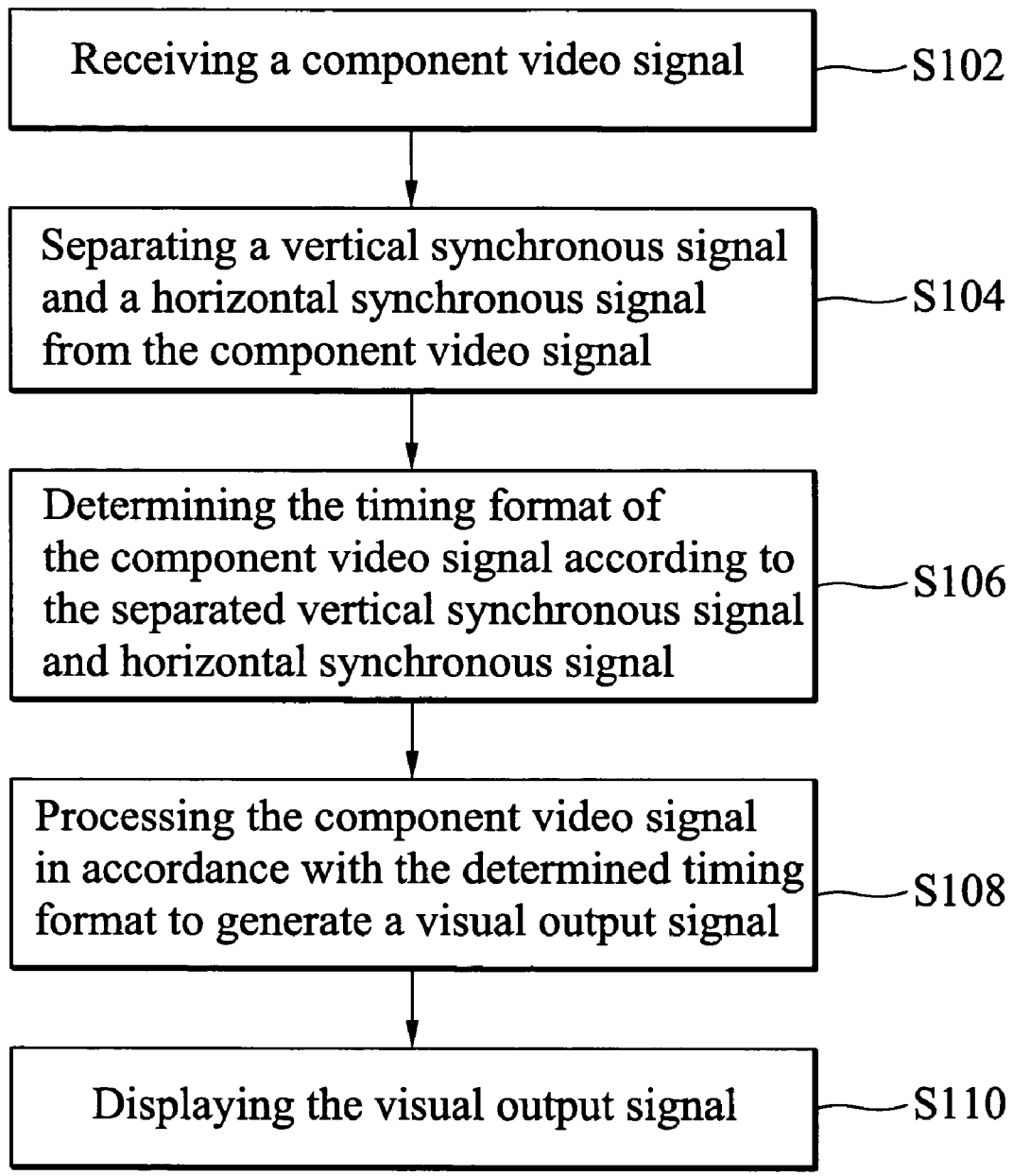
FIG. 1a is a flowchart of the method of displaying component video signals according to an embodiment of the invention.
Figure 1B:
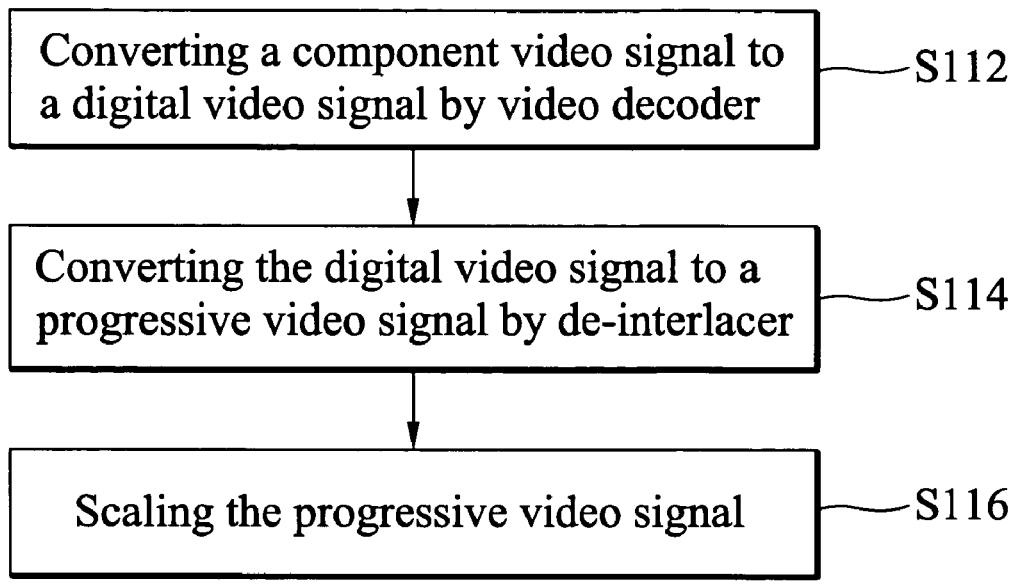
FIG. 1b is a flowchart of sub-steps of S108 in FIG. 1.
Figure 1C:
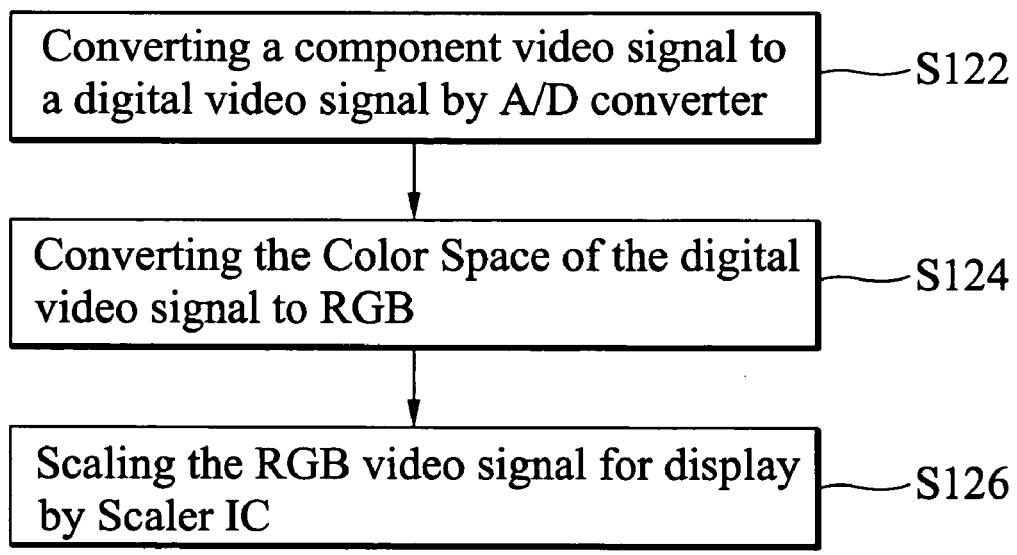
FIG. 1c is a flowchart of other sub steps of S108 in FIG. 1.

FIG. 1a to FIG. 1c are flowcharts of the method of displaying component video signals according to an embodiment of the invention. As shown in FIG. 1, in step S102, a component video signal is received. In step S104, a vertical synchronous signal and a horizontal synchronous signal is then separated from the component video signal. Thereafter, in step S106, the timing format of the component video signal is determined by analyzing the vertical synchronous signal and the horizontal synchronous signal, wherein the timing format of the component video signal can be one of 480i, 576i, 480p, 576p, 720p or 1080p. In step S108, Processing the component video signal according to the determined timing format of the component video signal. The step S108 comprises two sub steps. FIG. 1b is a flowchart of one sub step of S108 when the format of the component video signal is determined as 480i or 576i. As shown if FIG. 1b, in step S112, the component video signal is first converted into a digital video signal, and in step S114, a de-interlacer de-interlaces the digital video signal to obtain a progressive video signal. Thereafter, the progressive video signal is input to a scaler IC, thus visual output is generated. FIG. 1c is a flowchart of another sub step of S108 when the determined timing format of the component video signal is one of 480p, 576p, 720p or 1080i. In step S122, the component video signal is first converted to a digital signal, and in step S124, the color space of the digital signal is then converted to RGB format. Thereafter, in step S126, the RGB formatted digital signal is input to the scaler IC, thus visual output is generated therefrom. At last in step S110, the visual output corresponding to the component video signal is displayed.

Figure 2:
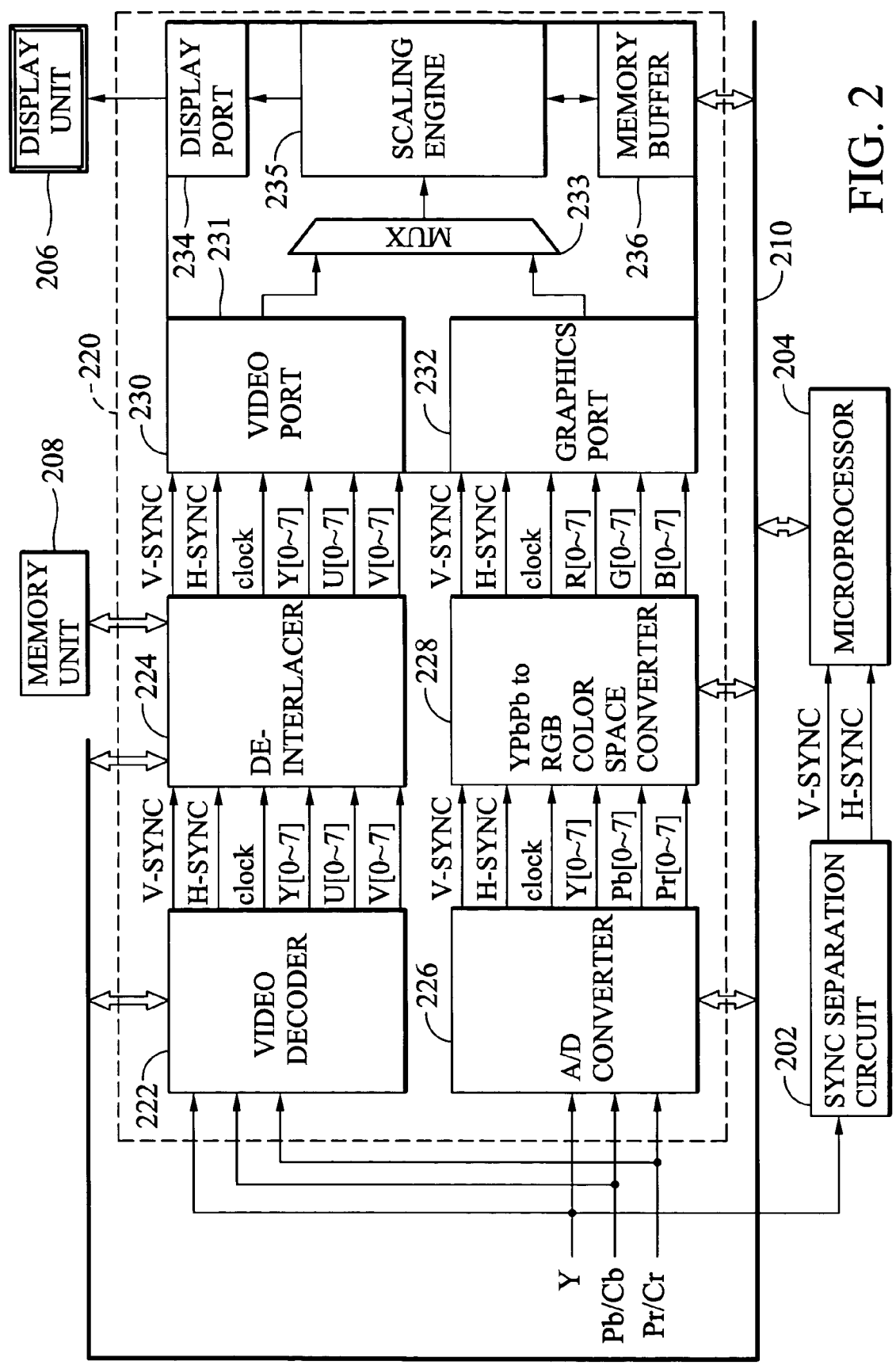
FIG. 2 is a block diagram of a display apparatus supporting multiple formats of component video signals according to an embodiment of the invention.

A display apparatus adopting the method in FIG. 1a is also provided. FIG. 2 is a block diagram of a display apparatus supporting component video signals conforming to multiple formats. In FIG. 2, the display apparatus 200 comprises a synchronous signal separation circuit 202, a video processing module 220, a microprocessor 204, a display unit 206 and a memory unit 208. The video processing module 220 comprises a video decoder 222, a de-interlacer 224, an ADC (analog-digital converter) 226, a CSC (color space converter) 228 and a scaler IC 230. Component video signals comprising luminance signal Y, color components Pb/Cb and Pr/Cr, are simultaneously connected to the video decoder 222 and ADC 226, the luminance signal Y is also connected to the synchronous signal separation circuit 202. In 202, a vertical synchronous signal V-SYNC and a horizontal synchronous signal H-SYNC are separated from the luminance signal Y.

When the display apparatus 200 receives component video signal, the microprocessor 204 determines the timing format of the component video signal by analyzing the vertical synchronous signal V-SYNC and the horizontal synchronous signal H-SYNC, and through the control bus 210, the microprocessor 204 accordingly chooses and controls a plurality of video processing units in video processing module 220 to process the component video signal.

When the determined timing format of the component video signal is 480i or 576i, the microprocessor 204 chooses and controls the video decoder 222 and the de-interlacer 224 to process the component video signal, and the processed signal is then input to scaler IC 230 through video port 231. The video decoder 222 converts the component video signal into a digital signal and the de-interlacer 224 connecting to memory unit 208 de-interlaces the digital signal to obtain a progressive video signal. In scaler IC 230, the progressive video signal is input through video port 231 and sent to scaling engine 235 through multiplexer 233. After processing, visual output is sent to display unit 206 for display through display port 234.

When the determined timing format of the component video signal is one of 480p, 576p, 720p or 1080i, the microprocessor 204 chooses and controls the ADC 226 and CSC 228 to process the component video signal, and the processed signal is then input to scaler IC 230 through graphics port 232. The ADC 226 converts the component video signal into a digital signal, and the CSC 228 converts the color space of the digital signal into RGB format. In scaler IC 230, the RGB formatted digital signal is then input to scaling engine 235 through graphics port 232 and multiplexer 233, and after processing, visual output is sent to display unit 206 for display through display port 234.

As described above, the display apparatus 200 is capable of automatically detecting the timing format of the component video signal and accordingly choosing a video processing route to present optimized video quality.

When processing component video signals conforming to YCbCr (480i, 576i) formats, rather than using ADC 226 and CSC 228, there are several advantages using video decoder 222 and de-interlacer 224 instead. The advantages include, saturation and tint adjustment are available while using video decoder 222 and de-interlacer 224, and the de-interlacer 224 is capable of dynamically compensating motion artifacts. Additionally, the video decoder 222 is more compatible with anti-copying technology. The ADC 226 is often unable to correctly convert and display an anti-copying video signal while the video decoder 222 functions normally.

Thus for component video signals conforming to YCbCr (480i, 576i) formats, optimized display quality can be obtained by inputting signals to scaling engine 235 through video decoder 222 and de-interlacer 224. Conversely, for component video signals conforming to YPbPr (480p, 576p, 720p, 1080i) formats, ADC 226 and CSC 228 are provided to input signals to amplifier engine 235, thus display quality thereof can also be optimized.

The scaler IC 230 also comprises a memory buffer 236 for temporarily storing video signals processed in scaling engine 235.

Another embodiment is provided to describe how the microprocessor 204 determines the timing format of the component video signal according to the vertical synchronous signal V-SYNC and the horizontal synchronous signal H-SYNC.

Figure 3A:
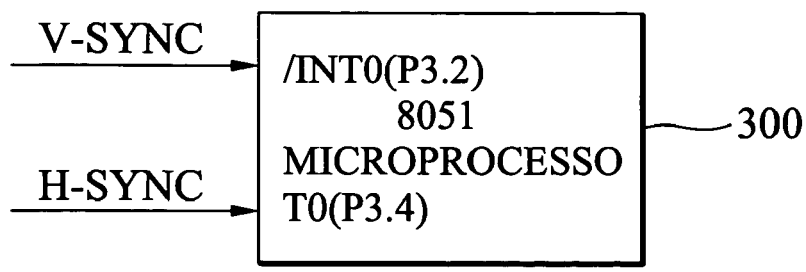
FIG. 3a shows the microprocessor 204 in FIG. 2.

FIG. 3a is a block diagram of microprocessor 204. In FIG. 3a, the 8051 chip 300 is used as the microprocessor 204 in FIG. 2. FIG. is an interrupt service routine, triggered by V-SYNC, for calculating the number of horizontal synchronous signals between two adjacent vertical synchronous signals. The vertical synchronous signal V-SYNC is input through an interrupt pin (P3.2) of 8051 chip, and the interrupt service routine in 8051 chip 300 is triggered thereby. The horizontal synchronous signal H-SYNC is input through a counter/timer pin (P3.4) of 8051 chip, and the number thereof is derived by a counter.

Figure 3B:
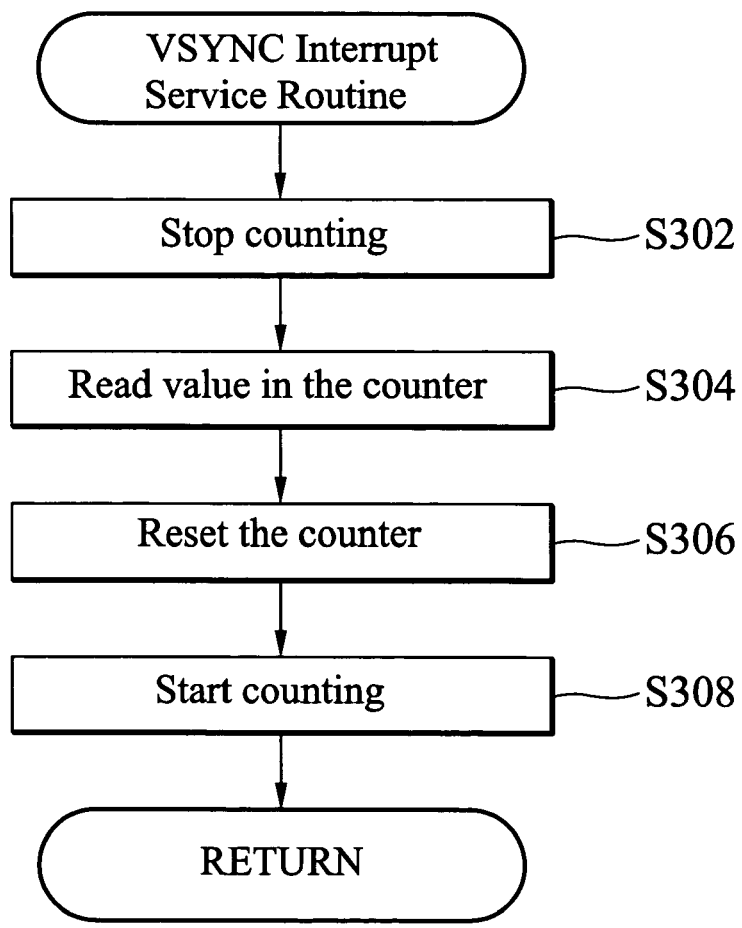
FIG. 3b is a flowchart of function routines in the microprocessor.

FIG. 3b is a flowchart of the interrupt service routine in microprocessor 204. The function routine is triggered by the vertical synchronous signal V-SYNC. In step S302, the counter is first halted, and in step S304, the value of the counter is read. Thereafter in step S306, the counter is reset, and another count begins in step S308, thus the function routine ends.

V-Total is the number of horizontal synchronous signals between two adjacent vertical synchronous signals, and the 8051 chip 300 determines the timing format of the component video signal according to the following rules:

If V-Total is within range of 262+/−Δ lines/field, the format is 480i.

If V-Total is within range of 12+/−Δ lines/field, the format is 576i.

If V-Total is within range of 25+/−Δ lines/frame, the format is 480p.

If V-Total is within range of 25+/−Δ lines/frame, the format is 576p.

If V-Total is within range of 50+/−Δ lines/frame, the format is 720p.

If V-Total is within range of 62+/−Δ lines/field, the format is 1080i.

Δ is a tolerable count error substantially ranging from 10 to 15, and is related to the synchronous signal separation circuit 202.

When the component video signal is input, the display apparatus reacts in the following steps. The microprocessor 204 repeatedly acquires the V-Total and determines the timing format of the component video signal accordingly. The video processing module 220 then processes the component video signal by either video decoder 222 and de-interlacer 224, or ADC 226 and CSC 228 according to the determined timing format, and display visual output on display unit 206 with optimized display quality.

In summary, the disclosed embodiments provide a method and apparatus for supporting multiple formats of component video signals, and optimize display quality of different format signals by different application circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of displaying component video signal, comprising the following steps:

receiving a component video signal;

separating a vertical synchronous signal and a horizontal synchronous signal from said component video signal;

determining the timing format of said component video signal by analyzing the vertical synchronous signal and the horizontal synchronous signal;

processing said component video signal in accordance with the determined timing format to generate visual output signal, wherein, when the determined timing format of the received component video is 480i or 576i, converting the component video signal to a digital video signal;

converting the digital video signal to a progressive video signal; and scaling the progressive video signal; and displaying the visual output signal.

2. The method as claimed in claim 1, wherein the timing format is one of 480i, 576i, 480p, 576p, 720p or 1080i.

3. The method as claimed in claim 2, wherein the step of processing said component video signal, when the determined timing format of the received component video is one of 480p, 576p, 720p or 1080i, comprises the following steps:

converting the component video signal to a digital video signal;

converting the color space of the digital video signal to RGB format; and scaling the RGB formatted video signal.

4. The method as claimed in claim 1, wherein determining the timing format of said component video signal further comprises the following steps:

calculating number of the horizontal synchronous signals between two adjacent vertical synchronous signal; and determining the timing format of the component video signal as one of 480i, 576i, 480p, 576p, 720p or 1080i according to the calculated number.

5. A display apparatus supporting multiple formats of component video signals, comprising:

a separation circuit, for separating a vertical synchronous signal and a horizontal synchronous signal from a component video signal;

a video processing module having a plurality of video processing units;

a microprocessor for determining a timing format of said component video signal by analyzing the vertical synchronous signal and the horizontal synchronous signal, and accordingly choosing and controlling the plurality of video processing units to generate visual output from the component video signal, wherein the timing format is one of 480i, 576i, 480p, 576p, 720p or 1080i; and a display unit, for displaying the visual outputs, wherein the video processing module comprises:

a video decoder for decoding and converting said component video signal to a first digital video signal when the timing format of said component video signal is 480i or 576i;

a de-interlacer for de-interlacing said first digital video signal to obtain a progressive video signal when the timing format of said component video signal is 480i or 576i;

an analog-digital converter for converting said component video signal to a second digital video signal when the timing format of said component video signal is one of 480p, 576p, 720p or 1080i;

a color space converter for color space converting said second digital signal to a RGB video signal when the timing format of said component video signal is one of 480p, 576p, 720p or 1080i; and a scaler IC for selectively scaling said progressive video signal or said RGB video signal.

6. The display apparatus as claimed in claim 5, wherein said scaler IC comprises:

a first input port for receiving the progressive video signal; and a second input port for receiving the RGB video signal.

* * * * *